Figure 1:
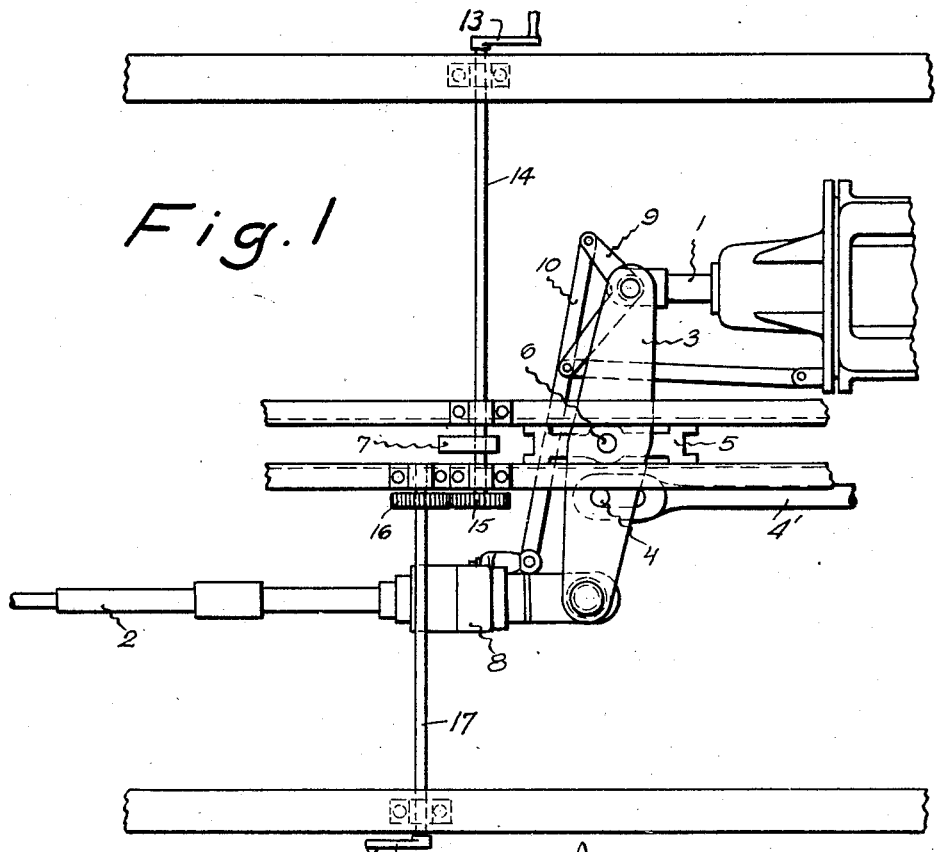

June 28, 1932. B. H. BROWALL 1,864,636
BRAKE LEVERAGE ADJUSTER
Filed July 9, 1930

B. H. Browall
INVENTOR

Patented June 28, 1932

1,864,636

UNITED STATES PATENT OFFICE

BERT HENRY BROWALL, OF MALMO, SWEDEN, ASSIGNOR TO SVENSKA AKTIEBOLAGET BROMSREGULATOR, OF MALMO, SWEDEN, A CORPORATION OF SWEDEN

BRAKE LEVERAGE ADJUSTER

Application filed July 9, 1930, Serial No. 466,844, and in Germany August 30, 1929.

The subject of this present invention is an improvement in vehicle brakes, especially brakes for railway cars, and more specifically it refers to brakes in which the leverage of the brake rigging between the brake cylinder and the brake shoes is controllable for the purpose of adapting the braking power, or efficiency, according to the load on the car. In brake systems of this kind, it is the object of the invention to provide for an automatic adjustment of the slacks between the brake shoes and the wheels according to the alterations performed in the brake rigging in respect of the leverage therein and in correspondence with the load on the car, so that the length of the brake piston stroke will always be kept constant.

Brake riggings provided with means for alteration of the leverage between the brake cylinder and the brake shoes have previously been proposed, and therefore such means involve no novel feature per se. In such brake riggings constructed so as to make it possible to alter the leverage, it has also been previously proposed to mount slack adjusters in the rigging for adjusting the slack between the brake shoes and the wheels, and a combination of that kind involves no novelty per se.

Now, in the combinations of the kind referred to above as previously proposed, one-way slack adjusters have been used only, i. e. slack adjusters adapted for adjusting the slack only in one direction, viz, for a reduction of the same for compensation of the wear of the brake shoes in use. It is obvious, however, that the amount of slack must also be varied according to the alteration of leverage of the rigging, provided that the length of the brake piston stroke is to be kept constant, or vice versa, the length of the brake piston stroke cannot be kept constant at an alteration of the brake rigging leverage with a constant amount of slack. For the purpose of obtaining a braking effect which, as far as possible, is uniform on all cars provided with brakes, the modern brake experts have more and more realized that the maintenance of a constant and uniform length of the brake piston strokes is a very important condition, and in fact it is in principle exactly this condition which has caused the introduction of the automatic slack adjusters in the brake constructions nowadays commonly used. Simultaneously herewith it has also been realized that an alteration of the braking effect according to the total weight of the car (including the load) is an equally important condition for obtaining an efficient braking, and this condition in its turn has caused, amongst other constructions, the introduction of the variable leverage brake rigging.

From the foregoing it will now be evident that these two conditions cannot be combined, in case a one-way slack adjuster of the type specified above is used in the rigging, and therefore the combinations of this kind previously proposed suffer from serious disadvantages the elimination of which is the main object of the present invention. In other words, the invention refers to an arrangement combining the advantages both of a constant length of stroke of the brake piston and a variable leverage of the brake rigging.

Another, more secondary, inconvenience inherent in the arrangements previously known is that when reducing the leverage there is the risk that the wheels may be locked by the brake shoes. In order better to understand this it may be assumed that a car has run a long way (many brakings) when fully loaded, with the brake rigging adapted for braking with a great leverage. Hence, in this car the slack adjuster has had sufficient time for reduction of the slacks in correspondence with said great leverage, and when thereafter the load is removed from the car and the brake rigging adapted for a smaller leverage, the slacks are too small for this leverage, and the result will be a locking or jamming of the wheels. Also this inconvenience is removed according to the invention, and a locking or jamming of the wheels by the brake shoes from the said reason cannot occur.

The invention is based thereon that in connection with the brake rigging, which in any manner independently of the invention is provided with means for either automatic or manual alteration of the leverage in correspondence with the weight of the car, is used a slack adjuster which is adapted not only for reduction of too large slacks between the brake shoes and the wheels but also for increasing of such slacks which from one reason or another, for instance due to alteration of the brake rigging leverage, have become too small. By such double-acting slack adjusters the amount of slack will be automatically adjusted according to the variation of the leverage of the rigging, and hereby it will also be possible to keep the brake piston stroke at a constant value.

Further it is to be noted, that slack adjusters adapted both for reduction of too large slacks and for increase of too small ones are also known apparatus per se, and for the purpose of the invention it is not important that any certain type of such apparatus is used, the only condition being that the apparatus is double-acting in the sense referred to above.

Therefore, in principle the invention is characterized in that in combination with a brake rigging provided with means for alteration or adjustment of the leverage, irrespective of the constructional features or manner of action of such means, is used a slack adjuster adapted both for reduction of too large slacks and for increase of too small ones. By this combination of the aforesaid constructions, which both are known per se, the advantages of the invention as specified above are gained.

The invention is illustrated in the accompanying drawing which shows two different embodiments thereof, each of the figures in the drawing showing a plan view of the arrangement.

According to Fig. 1 the constructional parts for alteration of the leverage of the brake lever 3 connecting the brake piston rod 1 with the pull rod 2 and pivoted on the pin 4 for the purpose of braking the loaded car consists of a sliding block 5 slidably mounted in suitable guides and connected with the lever 3 by means of the bolt 6. The rod 4' has a slotted connection at one end with the pin 4, the other end of the rod being connected at a fixed point with the car frame. The alteration of the leverage for the purpose of adapting the same for braking of the empty car is performed by rotating a cam disc 7 which thereby forms an abutment against the sliding block 5 and prevents the displacement of the same so that the brake lever 3 must tilt around the bolt 6. The slack adjuster has the general reference 8, such adjuster being similar to the construction disclosed in Patent No. 1,590,502, and in applicant's copending applications Sr. Nos. 446,335, filed April 23, 1930, now Patent No. 1,811,913, and 452,088, filed March 13, 1930, now Patent No. 1,811,914. By means of a link and lever system 9, 10 of any suitable kind the slack adjuster is actuated by means of the brake piston in such a manner that the actuation is dependent on a certain constant length of pison stroke, irrespective of whether the smaller or greater leverage is in action. Thereby the slacks will automatically be adjusted to a proper value for this length of piston stroke when using either of the leverages available.

The manual adjusting means shown in Fig. 1 consists of a crank 13 mounted at one side of the car framing and fixed to the shaft 14, to which is rigidly connected the cam disc 7, so that the latter is reversible by rotation when rotating the shaft by means of the crank. In order that the cam shall also be reversible in a similar manner from the opposite side of the car, the shaft 14 is provided with a pinion 15 meshing with another pinion 16 mounted on a shaft 17 extending to the opposite side of the car framing and provided outside thereof with a crank 18.

The operation is as follows: The pin 4 will normally serve as a pivotal centre for the lever 3, and naturally it will then also determine the leverage of the same. When the brake is applied or released the block 5 will slide idle in one direction or the other, and without having any influence on the functioning of the brake or the leverage of its rigging.

Upon application of the brake, the piston rod 1 will be pressed to the left outwardly from the cylinder, and the lever 3 will tilt around the pin 4, whereby the block 5, due to the action of the pin 6, will move towards the left, simultaneously as the pull rod 2 and the slack adjuster 8 mounted therein will be moved to the right, and by such movement the brake shoes are forced towards the wheels. When the brake is released, the members move in the opposite directions.

When it is the intention to perform a braking while using another leverage, the cam member 7 is rotated in the manner described above so as to come into an active position for abutment against the slide block 5. If then the movement of the block 5 towards the left causes an abutment against the cam member 7 before the pull rod 2 has travelled so far that the brake shoes have come into contact with the wheels, the lever 3, at the continued travel of the piston rod, will tilt around the pin 6 instead of the pin 4, as in the previous instance, and the pin 4 will slide towards the right in the slot of the rod 4'. Hence, in this instance it is the pin 6 that is determining for the leverage.

Under these conditions it will be apparent that a smaller movement of the piston rod towards the left is required for the purpose of approaching the brake shoes towards the wheels, than was the case when the pivot 4 was in action, and for the purpose of obtaining the same length of stroke of the piston rod 1, the length of the rod 2 must be increased, such increase of length according to the invention being automatically performed by employment of a double-acting slack adjuster 8 controlled in such a manner that its actuating mechanism 9, 10 is dependent on the length of stroke of the brake piston (piston rod 1) independently of the leverage used in each specific instance.

When releasing the brake after a braking under the conditions just described, it will be apparent that the slack is greater than before, due to the increase of length of the rod 2. During the first portion of the release movement, when the piston rod 1 travels towards the right in the cylinder, the lever 3 will be tilted around the pivot 6, and then the pin 4 moves towards the left to the end of its slot in the rod 4'. When the pin rests against the end of said slot, the lever 3 will be shifted so as thereafter to tilt around the pin 4. Then the continued brake release will be performed exactly as in the first instance, i. e. by means of the pin 6 the block 5 will slide towards the right, away from the contact with the cam member 7 and into its original starting position.

Figure 2:
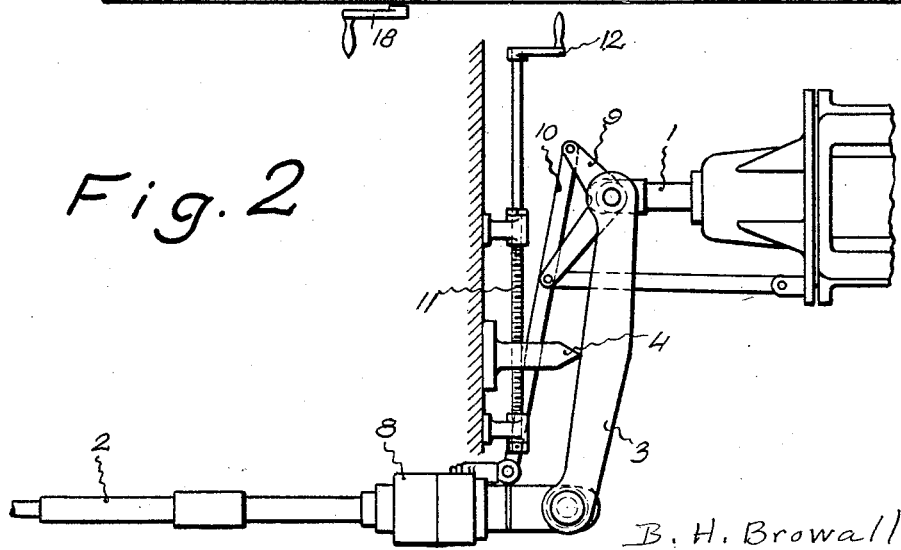

Fig. 2 shows a brake rigging provided with means for gradual alteration of the leverage. Herein the pivot block 4 (corresponding to the bolt 4 in Fig. 1) for the brake lever 3 is slidably mounted in suitable guides, and by means of a screw 11 provided with a handle 12 it may be brought into the desired position. The slack adjuster 8 is mounted in the same manner as in Fig. 1, and the same references are used on corresponding parts of construction.

With regard to its utility, the invention is naturally not limited to air brakes, and to the same advantage it may also be used in connection with electric solenoid brakes or the like under similar conditions.

What I claim and desire to secure by Letters Patent is:—

1. In a vehicle brake, a source of braking power, a brake rigging adapted to transmit the braking power to the brake shoes, means adapted for alteration of the leverage of the brake rigging according to the total weight of the car, an automatic slack adjuster mounted in the brake rigging and adapted not only to perform a reduction of too large slacks but also for performing an increase of too small slacks when required, and means for actuation of the slack adjuster in dependency of a movable part of the source of power so that the adjustment performed tends to keep the stroke length of such moving part at a constant value.

2. In a vehicle brake according to claim 1, the additional feature that the source of power consists of an air brake cylinder assembly, and that the actuation means for the slack adjuster forms a transmission between the said adjuster and the piston rod.

In testimony whereof I have signed my name to this specification.

BERT HENRY BROWALL.